United States Patent
Soupliotis et al.

(10) Patent No.: US 11,257,121 B2
(45) Date of Patent: Feb. 22, 2022

(54) OUT OF HOME DIGITAL AD SERVER

(71) Applicant: Hivestack Inc., Montreal (CA)

(72) Inventors: Andreas Soupliotis, Westmount (CA);
Giuseppe Cotugno, Cote St-Luc (CA);
Vincent Lizotte, Montreal (CA);
Pierre-Yves Troel, Lachine (CA);
Francois De Gaspe Beaubien, Montreal (CA)

(73) Assignee: Hivestack Inc., Montreal (CA)

( * ) Notice: Subject to any disclaimer, the term of this patent is extended or adjusted under 35 U.S.C. 154(b) by 0 days.

(21) Appl. No.: 16/026,991

(22) Filed: Jul. 3, 2018

(65) Prior Publication Data

US 2019/0172099 A1    Jun. 6, 2019

Related U.S. Application Data

(63) Continuation of application No. 14/618,774, filed on Feb. 10, 2015, now abandoned.

(60) Provisional application No. 61/937,904, filed on Feb. 10, 2014.

(51) Int. Cl.
*G06Q 30/02* (2012.01)
*G06Q 50/00* (2012.01)

(52) U.S. Cl.
CPC ..... *G06Q 30/0269* (2013.01); *G06Q 30/0244* (2013.01); *G06Q 30/0254* (2013.01); *G06Q 30/0276* (2013.01); *G06Q 50/01* (2013.01)

(58) Field of Classification Search
CPC .......... G06Q 30/0269; G06Q 30/0244; G06Q 30/0254; G06Q 30/0276; G06Q 50/01
See application file for complete search history.

(56) References Cited

U.S. PATENT DOCUMENTS

| | | | |
|---|---|---|---|
| 6,718,551 B1 * | 4/2004 | Swix | G06Q 30/02 348/E7.075 |
| 8,327,404 B2 | 12/2012 | Roberts et al. | |
| 2003/0088463 A1 | 5/2003 | Kanevsky | |
| 2006/0282855 A1 * | 12/2006 | Margulis | G06F 3/1431 725/43 |

(Continued)

OTHER PUBLICATIONS

First Office Action dated Apr. 18, 2017 issued in respect of corresponding U.S. Appl. No. 14/618,774, 23 pages.

(Continued)

*Primary Examiner* — Scott C Anderson
(74) *Attorney, Agent, or Firm* — Ferguson Braswell Fraser Kubasta PC

(57) ABSTRACT

There is provided a method for an out of home advertising campaign, the method comprising: supplying creative for the campaign; determining criteria for the campaign, the criteria comprising targeting a demographic; selecting one or more boards for display of the creative, the selecting based on static data, projected data, and optionally real-time data; and displaying the creative on the one or more boards. There is also provided an out of home digital ad server comprising: at least one digital board; a digital feed provider to provide each board with creative to be displayed; a computer processor for analysing data to optimize board selection based on a demographic; and a communication network to direct creative from the ad serving processor to the at least one digital board based on the selection of creative by the computer processor.

15 Claims, 5 Drawing Sheets

(56) References Cited

U.S. PATENT DOCUMENTS

| | | | |
|---|---|---|---|
| 2006/0287913 A1* | 12/2006 | Baluja | G06Q 30/02 |
| | | | 705/14.54 |
| 2006/0290592 A1 | 12/2006 | Wampier | |
| 2007/0027754 A1 | 2/2007 | Collins | |
| 2007/0136761 A1 | 6/2007 | Basmajian | |
| 2007/0226763 A1* | 9/2007 | Hempleman | G06Q 30/02 |
| | | | 725/46 |
| 2008/0215290 A1 | 9/2008 | Zweben et al. | |
| 2008/0215421 A1 | 9/2008 | Zweben et al. | |
| 2008/0215422 A1 | 9/2008 | Zweben et al. | |
| 2008/0270238 A1 | 10/2008 | Zweben et al. | |
| 2008/0288328 A1* | 11/2008 | Minor | G06Q 30/02 |
| | | | 705/14.42 |
| 2010/0082423 A1* | 4/2010 | Nag | G06Q 30/02 |
| | | | 705/14.43 |
| 2010/0228632 A1 | 9/2010 | Rodriguez | |
| 2011/0138412 A1 | 6/2011 | Roberts et al. | |
| 2012/0055985 A1* | 3/2012 | Allen | G06Q 10/087 |
| | | | 235/375 |
| 2012/0166965 A1* | 6/2012 | Nathan | G06F 16/64 |
| | | | 715/748 |
| 2013/0024298 A1* | 1/2013 | Irvine | G06Q 10/04 |
| | | | 705/14.73 |
| 2013/0073388 A1 | 3/2013 | Heath | |
| 2013/0138506 A1* | 5/2013 | Zhu | G06Q 30/0241 |
| | | | 705/14.53 |
| 2014/0164125 A1* | 6/2014 | Taylor | G06Q 30/0267 |
| | | | 705/14.58 |
| 2014/0205195 A1* | 7/2014 | Schonfeld | G06T 19/006 |
| | | | 382/209 |
| 2014/0207671 A1* | 7/2014 | Eom | G06Q 30/02 |
| | | | 705/41 |

OTHER PUBLICATIONS

Communication pursuant to Rule 62 EPC dated May 30, 2017 in respect of corresponding European Patent Application No. 15745766.4, 7 pages.

Communication pursuant to Rule 70(2) and 70(2a) dated Jun. 19, 2017 in respect of corresponding European Patent Application No. 15745766.4, 1 page.

Final Office Action dated Jan. 5, 2018 issued in respect of corresponding U.S. Appl. No. 14/618,774, 23 pages.

First Examination Report dated Oct. 28, 2019 in respect of corresponding Australian Patent Application No. 2015213454, 5 pages.

First Office Action dated Apr. 21, 2020 in respect of corresponding Canadian Patent Application No. 2,938,913, 6 pages.

Notice of Reason for Rejection dated Jan. 22, 2019 issued in respect of corresponding Japanese Patent Application No. 2016-568090, with translation, 10 pages.

Tian, P.: Realizing Targeted Advertising in Digital Signage with AVA and Date Mining, Proceedings of The International Multiconference of Engineers and Computer Scientists (IMECS) 2012, vol. 1, Mar. 16, 2012 (Mar. 16, 2012), 6 pages.

Lamar Advertising Company, "Lamar Advertising/Digital Billboard", http://web.archive.org/web/20131212202724/http://www.lamar.com/Products/Digital, Dec. 12, 2013 (2 pages).

Second Office Action dated Dec. 9, 2020, in corresponding Canadian Patent Application No. 2,938,913 (4 pages).

Examination Report dated Oct. 1, 2020, issued in corresponding United Kingdom Patent Application No. 1614158.2 (7 pages).

Communication pursuant to Rule 94.3 EPC dated Aug. 21, 2020, issued in corresponding European Patent Application No. 15745766.4 (7 pages).

* cited by examiner

OUT OF HOME DIGITAL AD SERVER

CROSS REFERENCE TO RELATED APPLICATIONS

This application claims priority of U.S. Non-Provisional patent application Ser. No. 14/618,774 filed on Feb. 10, 2015, which claims priority of U.S. Provisional Patent Application No. 61/937,904 filed on Feb. 10, 2014.

FIELD OF THE INVENTION

The present invention pertains to a system and method for distributing digital advertisements to a board in order to maximize reach for a desired target audience or demographic. More particularly, the present invention pertains to distributing digital creative to a network of out of home or public digital boards.

BACKGROUND

Ad serving is the process of taking an advertisement and distributing it intelligently in an attempt to maximize customer reach. Ad serving is a way of connecting advertisers, who want their ads to be seen, to people who are most likely to be interested in the product being advertised. Ad serving is commonly done on online websites and mobile devices. Advertisers do not buy a spot on a particular website; instead they pay for impressions and select criteria such as a target demographic. The ad server tries to dispatch the ad intelligently to the people that are most likely to be interested in its offer based on previously collected information. In an at-home model, search engines can take advantage of user behaviour to target individual users based on internet searches. For example, if a customer does a search for cruises in the Caribbean on their personal networked device, this search can be recorded so that advertising for cruises in the Caribbean can be directly sent to the user in online advertising spaces.

There are many tools known in the art for undertaking statistical analysis and data mining and analyzing information on data. United States Patent Application Publication No. 2013/0073388 to Heath describes a system for mobile and internet advertising based on collecting browser history, user preferences, social networking info, and linking it all together to present appropriate ads for that user. Heath is directed at advertising to single users of a networked device, and describes showing customized ads based on a user's browsing history and the location of the user. For example the advertiser could send the user a customized list of interesting products as the user enters a store, and a coupon code to entice the user to come back to the store.

However, such a concept is harder to apply in the out-of-home advertising world. The website ad serving model relies on building a profile for each individual user through various means (web history, social network profiles, ads clicked in the past, etc.), and building such an individual profile is simply not possible in out-of-home advertising. As it is, ad serving in this industry is very limited, and usually does little more than push ads based on geographical location.

In an out-of-home advertising campaign it can be challenging to determine where to place certain advertisements in order to reach the target audience. Although digital board location can be scored based on number of impressions, it is far more important for success in an advertising campaign to maximize the reach to potential customers, rather than simply to maximize the number of impressions. In one example, an advertisement for a women's deodorant on a digital board in a men's locker room may generate many impressions; however it is unlikely to result in increased revenue for the deodorant, unless, of course, the advertisement was aimed at the men.

Digital signage is now prevalent in public places and is being widely used by advertisers. Locations for placement of digital signs are selected by out-of-home decision engines that optimally choose board locations based on campaign objectives to maximize the number of the people who might view them. Most digital out of home advertising is sold through the concept of a loop: a digital billboard ("board") may have its uptime split between 6 spots of 10 seconds each, creating a 60 second loop. Advertisers purchase spots in a loop, during which their creative will play.

At its core, advertisers select various settings, such as demographics, time of the day and keywords that will assist in selecting the ideal boards for displaying a particular advertising campaign. They set a budget, which is consumed as the ads are displayed. In one example, United States Patent Application Publication No. 2008/0215290 to Zweben describes a method of determining a location based advertising campaign by scoring available physical spots in an advertising supply and determining which from among the available spots in physical locations to include in the campaign based on an advertising budget and the scoring of the available spots, with scoring based on the number of impressions. Zweben goes through the entire campaign creation process, from receiving customer orders to designing creative and reviewing them for appropriateness to generating a reports. The board selection process works by generating all boards that match the advertiser's request, ordering them by relevance, and picking the top ones until the advertiser's budget is spent. Once each board is scored and selected by the advertiser, the display method remains unchangeable, meaning that the advertiser places their creative at a particular board for a particular period of time, and the placement and/or schedule is not subject to change based on external characteristics.

Each board vendor also wants to present their boards as highly-valuable and perfect for each advertiser's individual needs, however assessment of the value of a particular board for placement of a particular advertisement can be challenging. There remains a need for non-subjective assessment of the selection of particular out of home digital boards for serving advertisements.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present invention is to provide an out of home ad server for selecting and displaying creative based on the demographic of the desired target audience.

In accordance with one aspect, there is provided a method for an out of home advertising campaign, the method comprising: supplying creative for the campaign; determining criteria for the campaign, the criteria comprising targeting a demographic; selecting one or more boards for display of the creative, the selecting based on static data, projected data, and optionally real-time data; and displaying the creative on the one or more boards.

In accordance with one embodiment, the selecting is based on real-time data, and wherein the real-time data is continuously updated.

In accordance with another embodiment, the selecting of the one or more boards is updated in real-time such that the selection of which boards and creative is displayed are changed during the campaign.

In accordance with another embodiment, the creative comprises images, video, web pages, dynamic elements, countdown timers, stock tickers, and any combination thereof.

In accordance with another embodiment, the method further comprises generating an ongoing report so that an advertiser can adjust the campaign, the creative, and/or a budget during the campaign.

In accordance with another aspect, there is provided an out of home digital ad server comprising: at least one digital board; an ad serving processor to provide each board with creative to be displayed; a computer processor for analysing static data, projected data and optionally real-time data to optimize board selection based on a demographic and determine which campaign each board should be playing, the computer processor selecting which creative is displayed on the at least one digital board; and a communication network to direct creative from the ad serving processor to the at least one digital board based on the selection of creative by the computer processor.

In accordance with one embodiment, the ad server further comprises a communication link to a data network to obtain real-time data from the data network.

In accordance with another embodiment, the ad server further comprises a plurality of digital boards.

In accordance with another embodiment, the at least one digital board further comprises a memory for recording playback-related statistics on the creative played on the at least one digital board.

In accordance with another embodiment, the at least one digital board further comprises a memory for storing the creative content, which is then downloaded and stored locally in a local database or file system.

In accordance with another aspect, there is provided a method for executing an out of home advertising campaign, the method comprising: determining static demographic data for at least one digital board; determining projected demographic data for the at least one digital board; determining real-time demographic data for the at least one digital board combining the static demographic data, projected demographic data, and real-time demographic data to select and display advertisements to be displayed on the at least one board.

In accordance with one embodiment, the real-time data based on social media trending or human movement tracking.

BRIEF DESCRIPTION OF THE FIGURES

For a better understanding of the present invention, as well as other aspects and further features thereof, reference is made to the following description which is to be used in conjunction with the accompanying drawings, where.

DETAILED DESCRIPTION OF THE INVENTION

Definitions

Figure 1:
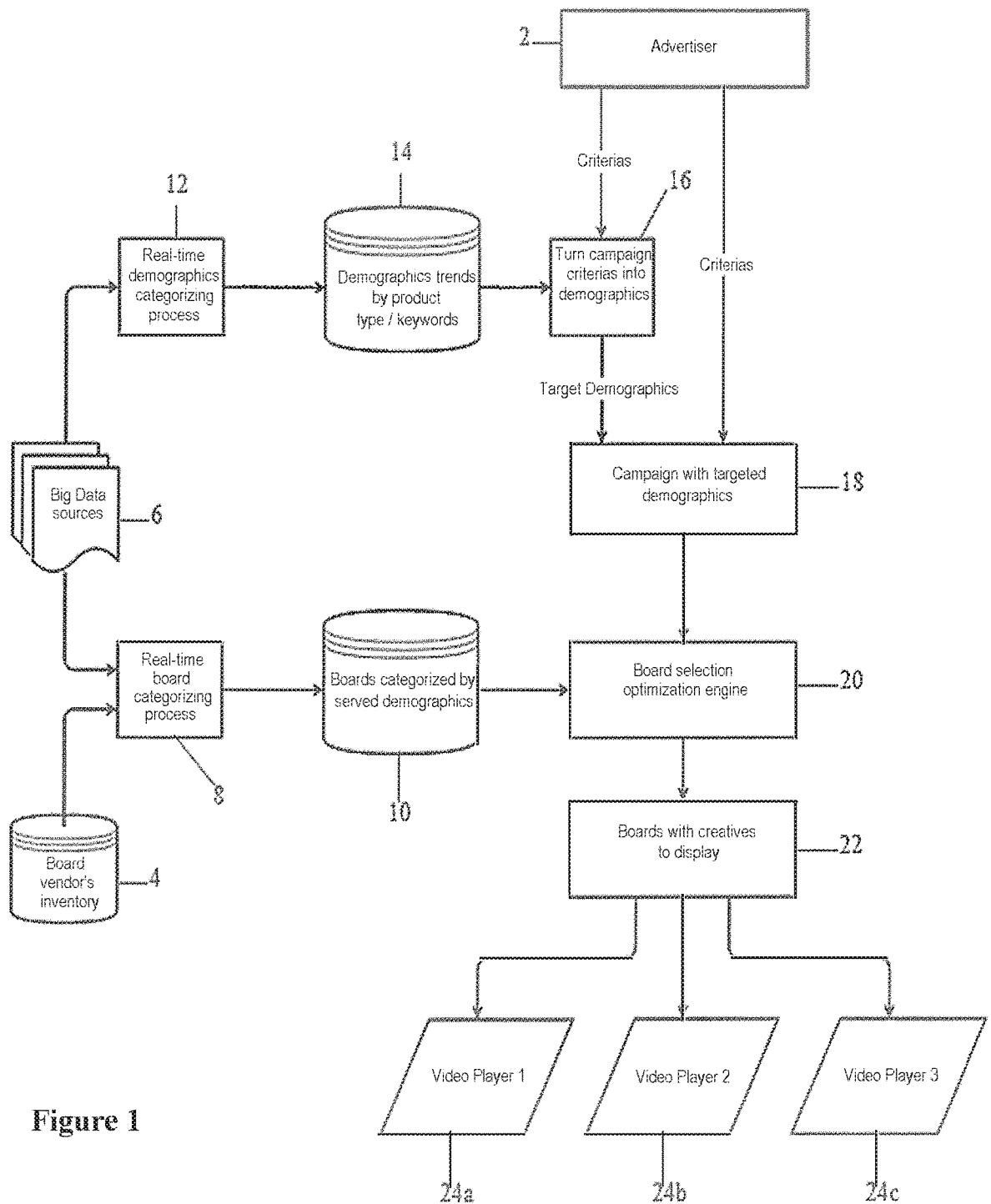
FIG. 1 depicts an exemplary process flowchart of the described ad server.

Unless defined otherwise, all technical and scientific terms used herein have the same meaning as commonly understood by one of ordinary skill in the art to which this invention belongs.

As used in the specification and claims, the singular forms "a", "an" and "the" include plural references unless the context clearly dictates otherwise.

The term "comprising" as used herein will be understood to mean that the list following is non-exhaustive and may or may not include any other additional suitable items, for example one or more further feature(s) and/or component(s) as appropriate.

The term "creative" as used herein is a term of art used to refer to an ad or set of ads for an advertising campaign. Non-limiting examples of advertising creative include still images, video, web pages, moving images, dynamic elements such as countdown timers or stock tickers, and any combination thereof.

The term "board" as used herein refers to any digital public signage or digital billboard mounted in a public space. Public spaces include outdoor public spaces, which include but are not limited to roadways, walkways, arenas and parks. Boards can also be located in indoor public spaces in buildings, non-limiting examples of these include clubs, restaurants, elevators, shopping malls, theatres, office buildings, sports centres, recreation facilities, health clubs and retail establishments.

The term "demographic" as used herein refers to a group of people that have a particular characteristic in common. Non-limiting characteristics on which a demographic can be defined are age (such as being within a particular age range), sex, race, sexual preference, socio-economic status, geographical location, or religion. Also included in this term are interest-based groups of individuals that share a common interest, either by public affiliation, or by interest derived from social media. Non-limiting examples of public affiliations that can be considered as demographic groups are club or organization members, employees of a particular company or organization, fans of a sports franchise, or students at a college or school. Interests can also be gleaned from social media based on a person's likes of, for example, particular hobbies, music groups, sports, or brands.

As used herein, the term "Big Data" refers to a collection of data sets that is very large. Such datasets have become increasingly available for analysis and trends can be gleaned by correlating selected data. Big data sets are routinely collected from the behaviour of individuals online as well as offline, and from human movement captured by positioning data. Big Data can be mined to find useable trends and patterns for ad serving.

As used herein, the term "out of home" refers to any indoor or outdoor public space where the digital board can be put on display.

Described herein is a system and method for distributing advertisement creative to a network of digital boards in order to maximize reach for a desired target audience. The presently described system employs data to effectively reach the desired target audience for the advertisement. The present system and method uses past, present and future information to learn and adjust itself in order to maximize reach for a desired target audience. In this way, static demographic data as well as broader trends can be used to select ads for display on a particular board that are relevant to the people currently in the area near the board.

The present method and system use data analytics to improve the reach and placement of out-of-home advertising creative. By tapping into a wide variety of data sources, boards can be intelligently classified in order to send the right ad to the right location at the right time. In addition, the system is enabled to constantly adjust itself based on real-time data, re-classifying its boards in real-time to accommodate emerging trends. Future projections are also made, allowing the system to plan ahead of time which content should be displayed at which location. A combination of static, projected and real-time data is thus combined to optimize display of advertisement to maximize impact and impressions of appropriate viewers.

When creating a campaign, advertisers must provide criteria used to control how, where and when the ads will play as well as evaluate the success of the campaign and how they will be charged for it. Possible criteria can include but are not limited to: target demographics by age; sex; ethnicity; geographical location; interests; number of potential customers who saw the ad; and time of day. These criteria are then used to determine which boards should play that campaign's content. Boards can be classified based on properties that indicate which campaign criteria they are able to fill.

The present system and method extend and transform a conventional digital signage "software player" to an ad server that mimics the behaviour of online ad servers on the Internet. Static and real-time data can be tapped into to determine what's trending. Social media websites, music websites, application programming interfaces (APIs), cellular carrier data insights, and other databases can also tap into out-of-home ratings, and can be applied as real-time data. Cross-referencing data from these sources to determine what's trending by demographic enables the gathering of anonymous information on vehicular and pedestrian observers passing by digital billboards to enable behavioural and contextual targeting. In this way, digital billboard companies can sell budget and demographic audiences instead of simply placement in specific locations and/or at specific times.

For smaller advertisers that cannot necessarily afford to book 10 boards for 4 weeks, or a pricey advertising loop desired by the board space vendor, selling via ad serving offers an opportunity to set a small budget and get pointed exposure to a particular target market. The small advertiser may not have done the market research to know that the people interested in their product are male 18-30 with a degree in computer science. However, social media that provides information not only about demographics such as age, sex, education level, can also provide information about interests, linking the small advertiser to a particular demographic which can be targeted using Big Data.

Data Types

The present method and system employ three main types of data: static data, projected data and real-time data. Real-time analysis of data is used to determine which demographic each board is most exposed to at any particular time. Even if no particular trend can be identified through real-time data analysis, projected data and static data can be combined to classify a board.

Static data is data that does not change for a certain period of time. It is assumed to be valid until a new set of data comes to replace it. Non-limiting examples of static data include traffic and population surveys, market studies, consumer spending trends and more. This data can have a time component, indicating that it is only valid for certain times of the day or at certain dates throughout the year. Static data serves as a baseline so that every board can be given basic information about which demographics it can serve. If nothing out of the ordinary is happening around the vicinity of the board, this data will be used as-is for campaign targeting purposes. Non-limiting examples of information that can be extracted from static data are:

Which demographics live there

Which demographics work there

Which demographics commute regularly through this area

How many people can potentially see the board each day

What are the most commonly purchased products in this area

How does this information fluctuate over time during a single day, and on weekdays compared to weekends What are the interests of the demographics in the area Projected data is data about specific events that will happen in the future which can bring in a unique target audience from the one usually frequented in the vicinity of the board. It begins and ends at a known moment in time. Non-limiting examples of specific events that can be factored in to projected data include sport events, music concerts, holiday parades, political rallies, etc. These may be one-time events or repeating events. By looking at this type of data, board information can be adjusted to better reflect the reality of the people near that board at that point in time. Demographics can shift, new interests may be served, the number of people near that board can be predicted to be higher or lower than usual, etc. This data allows the system to adjust, in advance, to better reflect what the reality at that moment should be. Examples of information that can be extracted from projected data include but are not limited to:

What kind of event happens here, and what kind of demographics do they bring?

How different are the regular demographics and those that come only for special events?

Is there a regularity to the events here?

Is this an emerging area, meaning that the temporary trends could soon become permanent?

Real-time data is data that must be analyzed as it arrives. It is usually unpredictable and short-lived. Examples include but are not limited to breaking news coverage, social network feeds, public reaction to events, etc. This data usually has geographical information associated with it. By analyzing this data, its content, its author, and its location, more adjustments can be done to better pinpoint the audience the board can serve. Real-time data is different from the other data sources in that there are two dimensions to its use. First, the message is important, because it can indicate trending interests in specific areas. But even if the message is irrelevant, the information about that author's message can be a rich source of information. The demographics of the people in the vicinity of the board can be obtained by tapping into the personal profiles of the people in the vicinity of the board, and ads can be selected and served tailored to these demographics. Some non-limiting examples of information that can be extracted from real-time data are:

Profile of the user who made a social networking post while being close to a board Pictures taken close to a board Hashtags and other such keywords in messages Groups, events, activities and other such metadata that can be linked in a message Nearby location, such as a commerce, that a user has identified as being currently located ("checked-in")

Current traffic condition on roads near the board

Real-time data can be obtained through social media sites such as, for example, Facebook® and Twitter®. In one example, if a particular product is trending on social media, increasing the display of creative directed to that product at the same time can result in a greater overall impression to viewers than if the same creative is displayed at a time where there isn't trending support on social media. For example, if a sports star tweets a favorite brand, board display of creative for the same brand can be intensified for a certain period of time to solidify the viewer impression.

Application of Data Types to Ad Serving

Advertisers set a budget and target demographics through various criteria such as, for example, explicit demographic choice, product type, keywords, or time of day. The network collects trends through data analytics, also referred to as "Big Data", in order to categorize the boards, adjusting in real-time to better reflect the audience currently near each board. In this way, the creative loop can be automatically adjusted based on social trending rather than merely on demographic and population data (static data) obtained from databases. The creative placement planning process occurs and is updated constantly in real-time, creative is shifted around to accommodate trending and special events, and the creative loop on boards is changed while the campaign is running Continually tweaking of the campaign by tapping into social trending and considering historical data and current trends provides an analysis of short-term impression projections, which are used to catalogue and categorize the boards in real-time.

As shown in FIG. 1, an advertiser 2 who wishes to launch an advertising campaign can place their creative based on demographic of users rather than simply on board location or capability. Vendors of space on public boards expose their inventory 4, including details of the boards such as location and size. Data sources, such as from Big Data 6, contribute analytical data to a real-time demographics categorizing process 12, as well as to a real-time board categorizing process 8. The boards are then re-categorized based not only on static and projected data, but also on real time data, and a determination is made on board characterization by served demographics 10. Concurrently, demographics trends are followed 14, for example by product type or keywords, and can also be tracked by interest, human movement, traffic movement or spontaneous social media trending. In this way, the advertising campaign is shifted to selection of ads and locations based on demographic of viewers 16 in the vicinity of the board, and the campaign is targeted to a particular demographic 18 that is updated in real-time. A board selection optimization engine 20 then selects the ideal boards on which to play the advertisement, and the boards with creative to display 22 are provided with creative on video players 24a, 24b and 24c.

Advertisers can also bid for spots, and can be charged based on how relevant the boards are to their needs, with price adjusted based on fluctuating parameters such as demand for the selected boards. The ad serving system connects these together, sending creative to the boards that are currently able to best meet the advertiser's criteria. Real time trending on social networks is thus factored into board selection and creative rotation, and the system rotates the creative to maximize demographic fulfillment. The creative can thus be shifted around to different boards at different times while the campaign is running to optimally target the desired demographic. Play logs and trends can also be collected to construct reports presented to advertisers in order to prove the relevance of the boards and display times that have been selected for them.

Although some digital billboards are individually run, there are a few large digital billboard companies which control and/or own many thousands of out-of-home public boards. Not only will each of these boards have different classifications based on static data, but they will have different time-dependent classifications based on projected and real-time data. The present system and method can be used internally, byt the company itself, to optimize ad placement of each creative based on the real-time classification of each board. Large digital billboard operators may also be interested in opting for a single-company ad server that they can have more control over. In addition, cross-company ad serving platforms can be envisaged which select digital boards with particular real-time classifications to optimize placement of creative. For example, signage around transit stations or restaurants around an arena can be owned/operated by different companies, however it may be useful for a particular advertiser to purchase board time for a time range around a concert to advertise a ware or service targeted to the concert-goers.

One embodiment of the present system is comprised of a digital signage software player that has ad serving capabilities. Digital billboard operators can then, instead of selling spots in loops and day parts, sell an audience or demographic to an advertiser that can be retargeted while the campaign is running, in a similar way as it accomplished in the online media world. Large digital billboard companies can also trade in playlist-based players for ad serving players.

Board vendors can also connect their boards with the present ad server through a communication network. The boards can register themselves, providing data about them such as their size, location and orientation. Operators can manage their inventory through software such as a web application. Each board is connected to a nearby digital feed provider, such as a computer or embedded system, also commonly referred to as a video player. That video player connects with the ad server and requests content, which is then downloaded and stored locally in a local database or file system. Content can then be played on the connected screens or boards. The video player periodically reconnects with the server to update itself and get an updated list of content to play, which may have changed due to new advertisement contracts or evolving data trends. As part of this communication, the video player also submits a report of the content it played so that the ad server can keep track of it for various purposes such as consuming the advertiser's budget and assembling an aggregated report based on data from various video players. Optional screen captures, such as from a camera facing the board, can be sent and collected by the ad server for proof of performance reporting purposes.

Advertisers can purchase screen time through software such as at a web-accessible store, where they can specify various settings such as desired demographics, type of product being advertised, keywords, etc., that will allow the system to target on which boards their ad should run. They set a budget, and the system produces an estimate of the boards and impressions they might obtain. The software can also allow the advertiser to upload and manage their own creative. As their campaign runs, the advertiser can get feedback in the form of an aggregated report, and can alter or extend their campaign as needed.

Figure 2:
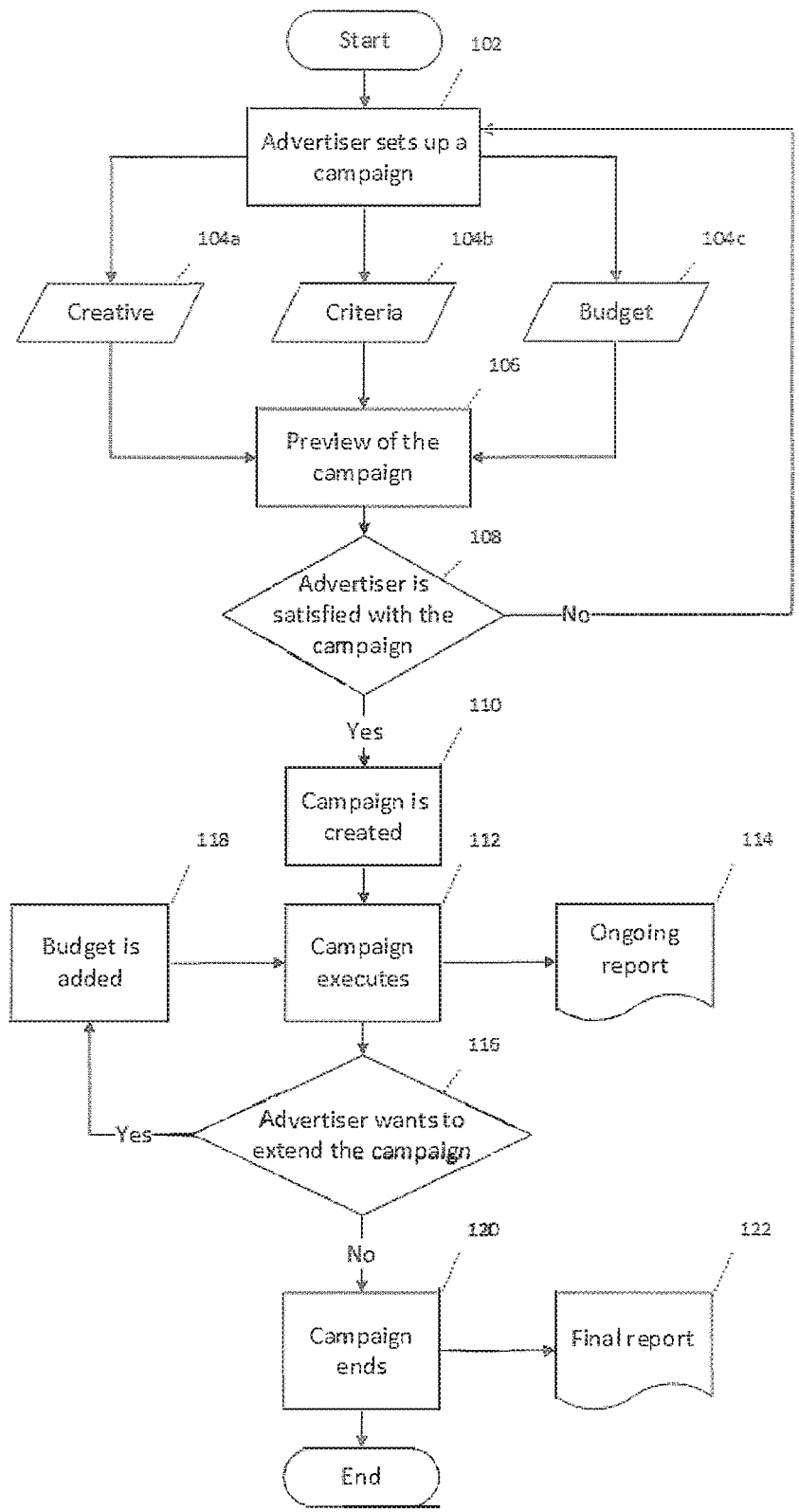
FIG. 2 depicts an exemplary process flowchart of a campaign purchase process.

FIG. 2 illustrates the method of an advertiser purchasing a campaign through the system. The advertiser 102 initiates the campaign by indicating a desire to place creative in an out-of-home advertising system. The advertiser can optionally use a service, such as a website, to identify themselves and initiate the campaign creation process. The advertiser supplies the creative 104a, which is the content that will play on the boards. Examples of creative include but are not limited to images, video, web pages, dynamic elements such as countdown timers or stock tickers and any combination thereof. The advertiser may also supply one or multiple of such creative.

The criteria 104b represents what the advertiser wants to accomplish with the particular advertising campaign. Examples includes target demographics, a total impression count, geographical locations or markets that should be served, and possible interests and keywords such as, for example "near a transit station", "near a school", "near a recreation facility", etc. These are used to determine the appropriate location to display the campaign and the end evaluation of the success of the campaign. The budget 104c set by the advertiser that will determine how long or how broad his campaign will be. Every time an ad plays, budget is consumed based on various factors. The campaign is over once the budget is fully spent.

After deciding on the details of the campaign, the advertiser is presented with an estimate of how the campaign will take place by way of a preview of the campaign 106. Information presented as part of the campaign preview can include a list of possible boards, how many times the ad can be expected to play, which times of the day the creative will play, and other details regarding the placement of the creative. Projected events that have affected the board selection, such as upcoming sport events, can be provided to the advertiser to explain the board selection. The information presented to the advertiser in the preview of the campaign 106 will be a plan for execution of the campaign since the actual campaign execution may be adjusted in response to real-time data and events, which would make alternate placement of creative more favourable to the advertiser and result in different ad placement.

The advertiser is then given the choice to accept the campaign or go back and change one or more settings to obtain a different result. The advertiser 108 can be presented with suggestions on how to tweak the campaign to obtain better results, such as targeting more specific demographics or choosing different times of the day. Once the advertiser is satisfied with the campaign 108, the campaign is created 110. Once the conditions are met, such as respecting the start date of the campaign, the ads will begin playing.

Campaign execution 112 occurs when ads start playing on boards that are determined to be relevant based on the criteria 104b of the campaign. An ongoing report 114 can be maintained for the advertiser so that the advertiser can adjust the campaign or adjust the creative or budget as desired during the campaign. Some campaign criteria may also be tweaked to alter the board selection process. As the ads are played, the boards report back to the ad server, which aggregates the playback information into a report for the advertiser to consult at any time. Information includes which boards the ad has been played on, how often, at what time of the day, which demographics were reached, which real-time events caused these particular boards to be selected, etc. This serves as proof of performance for the advertiser and provides statistics and explanations for why and how the campaign took place the way it did.

At any point during the campaign, the advertiser may decide to extend the campaign 116 by allocating more budget to the campaign. If the campaign's budget is increased 118, the campaign can be extended in duration or the scope broadened, targeting a wider variety of boards and/or for a longer duration. The campaign ends 120 when the budget is fully exhausted and the advertiser has decided not to renew it by allocating more funds. The ads for this campaign will be removed from the loop and will not play anymore. Similar to the ongoing report 114, a final report 122 is generated for the advertiser to review. Since the campaign is over, the final report will not change over time. A detailed informational analysis can be provided in the final report 122 to provide the advertiser with the schedule and play of ads, and can also include the number and type of impressions, depending on the board type and system enablement in the vicinity of the board.

Data Analysis

Data is analyzed for two main purposes: linking product information to target demographics, and determining, for each board, what are the demographics it is able to fulfill at different points in time. This analysis can be carried out using a variety of data and Big Data sources, such as, for example:

Social medias trends
Aggregated Consumer insight
Real-time Video feeds
Activity-generated data
Location-based services
Traffic patterns and travel studies Product information can also be linked to target demographics. Advertisers can explicitly decide which demographics they are targeting, or they can simply provide the system with information about what they are advertising, such as the type of product being advertised. Since boards expose which demographics they are able to serve, rather than which product type they are able to sell effectively, a link can be established between the information provided by the advertiser and which demographics should be targeted. Big Data trends are analyzed periodically to populate a database allowing the system to link these together.

In one example, an advertiser sells home insurance, but does not know which demographic they should target for a particular ad campaign for earthquake insurance in particular. The system discovered, using Big Data analysis techniques, that males between 30 and 45 years old living in areas with a high risk of earthquake are the most common seekers of home insurance and could be a profitable demographic to target. This step can be bypassed if the advertiser decides to target specific demographics instead of letting the system determine them.

Board Selection

Board selection is the process used to maximize the global reach of the entire network. The goal is to optimize the distribution of creative across the network so that each board is used to its maximum potential. Demographics density is used to give each board a score. Denser boards are those that are highly-specialized in reaching a specific demographics, while less-dense boards are those that have a broad, general audience reach. As much as possible, creative is assigned to dense boards that meet the advertising criteria, maximizing the boards' potential value while leaving the flexible boards open.

Each board has its own feature data, such as location, size and capability. In order to receive appropriate content, each board is categorized for certain demographics. Big Data trends can be analyzed and linked with the board vendor's inventory to discover what demographics can be served by each board. Such information is stored in the Ad Server's database to be referenced when a Video Player needs content to play. Special keywords can also be associated to a board, either manually or automatically through data analysis, helping to fine tune selection of content to be played. This data is constantly being adjusted in real-time based on trends coming in from various data and Big Data sources, such as social media, consumer insight, traffic, locational and news sources. Short-term projections can also be done, allowing content to be sent ahead of time to the boards so it is ready to play when needed. Some non-limiting examples of real-time Big Data sources are:

Social media activity (i.e. Facebook® posts, Twitter® feeds, FourSquare® checkins, etc.)
Video feeds
Activity-generated data
Cellular data insights One example of board classification is described for a board located near a shopping mall in New York. First, static data is analyzed to broadly categorize the board. Using traffic studies provided by the Traffic Audit Bureau (TAB), which provides ratings for the Out of Home industry, the system knows that this particular board is seen by several demographics, the main two being "Male 25-40 Caucasian", which constitutes 40% of the total audience, and "Female 25-40 Caucasian", which constitutes 30% of the total audience. Other groups together constitute the remaining 30%. It is known from urban planning data that this area contains a shopping mall as well as several office buildings, allowing the system to add "shoppers" and "office workers" to the list of demographic audience served by this board. Consumer spending trends indicate that people in this area are mostly purchasing furniture, groceries and books, which can be added to the list of interests served by this board.

Next, projected data is used to refine this categorization at certain points in time. By connecting with the data sources of major event organizers, the system knows that there is an upcoming concert for a popular boy band. This event is taking place on February 21$^{st}$ at 7 PM with a duration of 3 hours. The band's name and concert details are cross-referenced with various sources for music-related information and it is discovered that this band is mostly followed by 18-24 year old females. Since the board is right in front of the concert's venue, it is expected that it will have great visibility for this demographic around the time the concert begins and ends. Thus, around 6:30 PM and 10:30 PM, the board should show ads relevant for 18-24 females. Nearby boards located close to public transit systems can also be re-categorized to fit this newly discovered demographic because this age group has been shown, due to transit studies, to make heavy use of public transportation systems. Thus, for two hours before and after the concert, those boards would show ads relevant to this demographic because chances are they will represent a high percentage of the public transit users during those times.

Finally, real-time trends are used to fine-tune the categorization on a real-time basis. This is demonstrated by the following example. On a calm Sunday afternoon, a group of protesters suddenly takes over the area near a digital board. They are protesting for lower education fees. The event is highly publicized in social media both by protesters and by people passing by. The messages being posted on social networks are mostly photos of the protesters, which can be analyzed using facial recognition to determine that most protesters are 18-24 males. The topic of conversation, protesting for lower education fees, gives a good indication that the people protesting, and thus the people near the board, are in or about to enter college. The profiles of people posting about the protest can also be used to obtain limited information about who is around the board, confirming that the board should display ads relevant for 18-24 males that are college students.

Figure 3:
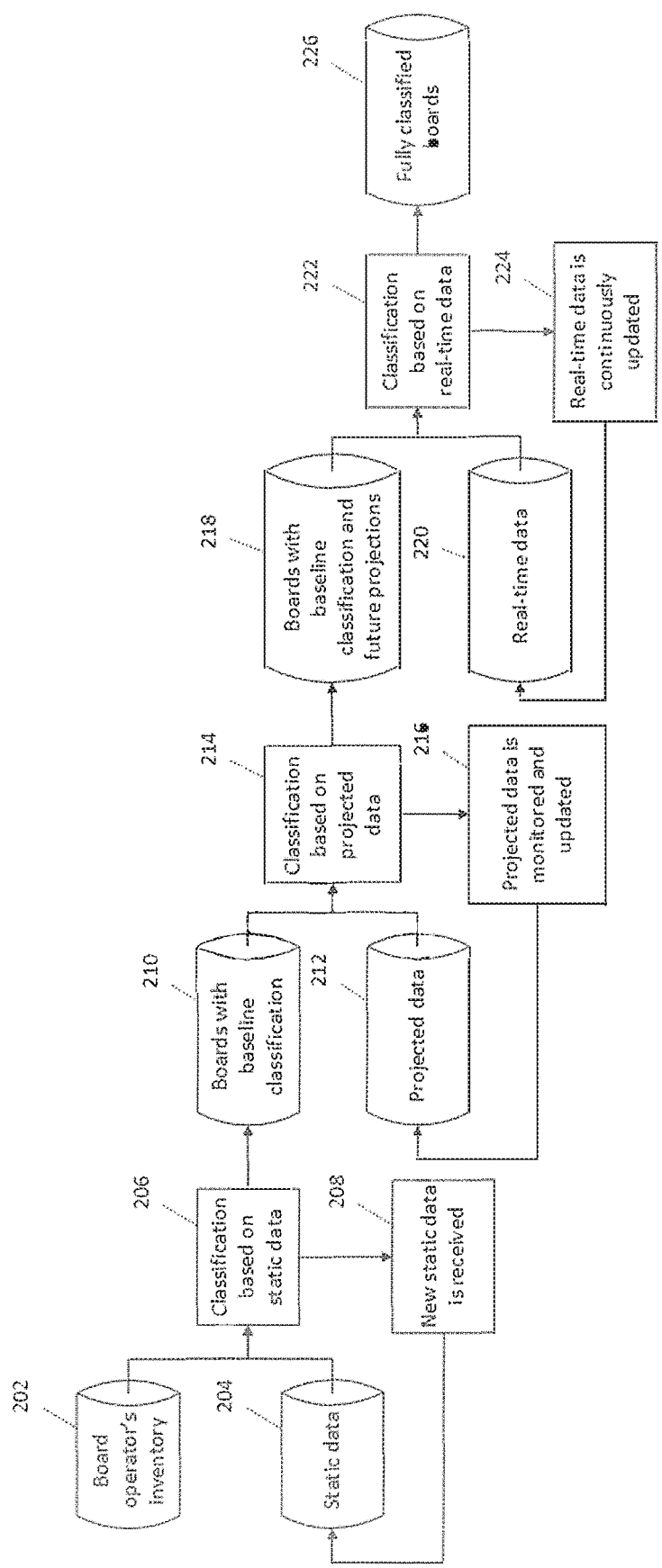
FIG. 3 depicts an exemplary process flowchart of a board classification process.

FIG. 3 illustrates the process of categorizing digital boards. This allows the system to determine which boards can be used to most efficiently display ads based on the criteria of the campaign. The board operator's inventory 202 constitutes a listing of the digital boards owned by that operator as well as basic operational data such as the board's identifier, location, size and format, functional capabilities, operating times, etc. Static data 204 is obtained from databases to provide information such as, for example, traffic and population surveys, market studies, consumer spending trends. Classification of the board 206 is based on static data as well as the board operator's inventory 202 and the characteristics of each board in the inventory. This process combines the operator's inventory with the static data to augment the inventory with information concerning the campaign criteria that each board is able to fulfill. For each board, details such as its location are used to correlate it with pieces of information contained in the static data. For example, a board's geographic coordinates can be used to search the static data and locate which buildings are close to it, such as shopping malls, office buildings or schools. Such information allows the board to be classified and tagged with demographics and other campaign criteria it can serve. Static data will occasionally be updated with more recent information from new surveys and studies when new static data is received 208. When that occurs, the new data is imported into the system and the process at 206 is performed again. The result of board classification step 206, is a set of boards with baseline classification 210. This is a listing of the digital boards owned by the operator augmented with categorization information, which serves as a baseline onto which other layers of data will be added.

Projected data 212 is obtained for the area in the vicinity of the board to determine if there is a unique event that could change the demographic around the board compared to the usual demographic predicted by the static data 204. An update classification based on the projected data 214 is done. Similar to process 206, information identifying the boards is used to locate useful information concerning it in the projected data. This will result in the board's classification being altered for certain periods of time in the future, such as served demographics being different when a nearby concert hall is hosting a show. Projected data is monitored and updated 216 whenever a relevant change is detected, the process at 214 is performed again for the boards that can be affected by the change in the data. The result of the board classification based on projected data 214 is a listing of the digital boards owned by the operator augmented with categorization information that has a time component, varying at different moments in time based on what events are expected to happen nearby. This results in a set of boards with baseline classification and future projections 218 based on static data as well as projected data.

Real-time data 220 is then obtained and factored into the classification on a continual and ongoing basis. As previously described, real-time data is obtained from social trending data such as traffic patterns, human movement patterns, and social media sources. The real-time data 220 provides the final tweaks to the board's classification, making it better reflect the reality of what is happening right now in the nearby area. Real-time data 220, true to its name, its constantly changing and must be monitored in real-time. Any piece of data that could be relevant due to its message, author, location or other factor is analyzed and useful information is added to the knowledge bank of real-time data 220 so that a classification based on real-time data 222 can make use of it the next time it is performed. The real-time data is continuously being updated 224 to provide a real-time analysis of board optimization. Real-time data can also be weighted based on the strength of the observed trend either locally in the vicinity of the board, or globally in the social media. In addition, real-time trends can cause the immediate categorization of the board to temporarily shift to capture a demographic moving in the vicinity of the board. The analysis provides a fully classified set of boards 226 which have been classified based on a set of static, projected and real-time data. The result of this process is a listing of the digital boards owned by the operator augmented with categorization information that has a time component.

Projected and real-time data can therefore be used to temporarily alter what a board displays by identifying trends and tweaking the board's selection of advertisements based on temporary demographics. If there is no noticeable projected data or real-time trending near the board, static data can provide adequate selection criteria to fall back on for advertisement or creative selection.

Figure 4:
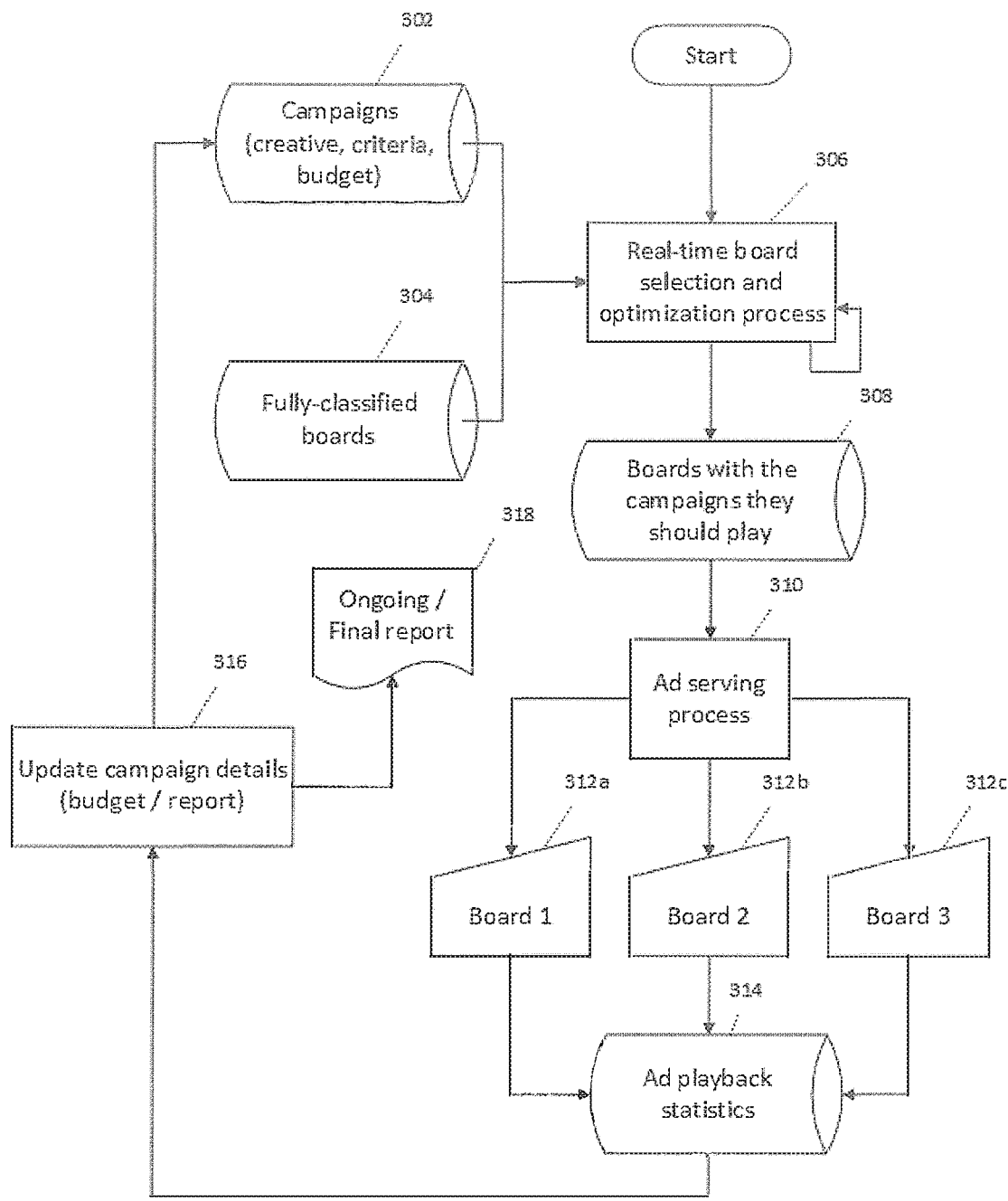
FIG. 4 depicts an exemplary process flowchart of a board selection process.

FIG. 4 illustrates the process of selecting boards and dispatching campaigns to appropriate boards that should play their associated creative. This classification is what is used by the board selection process described in FIG. 3. Information concerning the active campaigns 302 created as part of campaign creation process explained in FIG. 2 is considered. Fully classified digital boards 304 augmented with categorization information and real-time trends are the result of the process described in FIG. 3. A real-time board selection and optimization process 306 then examines every active campaign and every board to determine which campaigns should play on which boards. As described, board and creative rotation selection is an ongoing process that is continually updated in order to adjust the board selection based on new information, such as updates to the boards classification caused by emerging real-time data trends. The listing of boards along with which campaign they should be playing at any exact moment is continually reconsidered based on real-time data and is regularly updated in real-time to best reflect the current reality of the location of the boards.

As shown in FIG. 4, an ad serving processor 310 or digital feed provider comprising a processor comprises a communication system such as a computer network, which is used to provide each board with information on which campaign it should be playing as well as the selected creative. This processor also provides boards with updates should they need to change the campaigns they are displaying. Digital billboards 312*a*, 312*b*, 312*c*, may be implemented through a combination of screens, computers and digital player software that receives directives from the ad server and play content to satisfy the requirements of an advertising campaign.

As they play content, the digital billboards 312*a*, 312*b*, 312*c* keep track of various playback-related statistics such as what creative they played, how many times, at what time of the day, etc. Such ad playback statistics 314 are reported back to the ad server. The statistics for every board are collected and aggregated into an update of campaign details 316, which can include the budget and report of where and when the campaign played. These statistics are used to fill reports and consume the campaign's budget. The update of campaign details 316 can be provided as a report to the advertiser to provide the advertiser with proof of performance and details about the campaign execution. This is further described in FIG. 2, steps 114 and 122.

The details of the board selection algorithm can be determined in a variety of ways. The challenge of board selection can be described algorithmically as follows: given boards with x associated features (some static, some projected and some dynamic/real-time) and y target categories (such as demographic, geographical location or target industry advertisement) each board can be classified in real time. The algorithm for board selection considers the available boards with their associated feature data as well as the target categories for the campaign, and provides a matching between boards and campaigns that maximizes target delivery over one or more campaigns.

One approach that can be used to achieve this result is to use machine learning methods for classification. Given features $X(x1, \ldots, xn)$ (discrete or real such as area or weekly impressions per demographic category) and possible target categories $Y(y1, \ldots, yn)$ derive hypothesis $h(x)$ such that $h: X \rightarrow Y$; given a board x with features $x1, \ldots, xn$ classify the board to one or more of $y1, \ldots, yn$ target categories. Other implementations for this algorithm include but are not limited to support vector machine learning (SVM), neural nets for classification, decision trees and random forests. In one illustrative example using the decision trees method:

Assume 4 target categories; LA 18-50, LA 18-24, NYC 18-50, NYC 18-24

Figure 5:
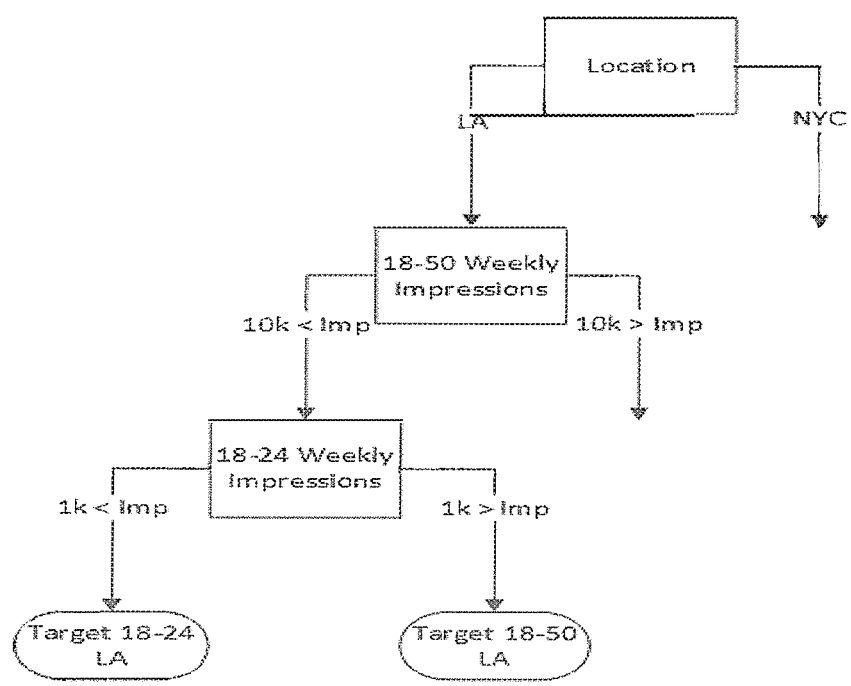
FIG. 5 depicts an exemplary process flowchart for optimizing the board selection.

Assume 2 panel features are available; area and weekly impressions by demographic Shown in FIG. 5 is a partial diagram of a decision tree classification, being the derived result from the available data set. In this example, board location is considered based on the geographical location of the board and the product being advertised. For example, a soft drink with images of people on a beach may sell well in Los Angeles (LA) in February, but not in New York City (NYC). If the advertiser has a younger demographic as the target for the creative, they may wish to select a narrower target audience by age range, such as 18-24 year olds. Although the campaign may receive fewer overall impressions, each impression will have a greater impact from an advertising perspective since it is received by more members of the target audience.

After board classification is achieved, campaign targets are reviewed and boards are matched to campaigns according to the dynamic classification. Since a board may have more than one viable target category ranked, further optimization can be done to select boards based on budget, running time, or other criteria. In some analyses, the present approach can include a continuous process of improvement as the algorithm starts with a derived initial data set (i.e training set) and improves it as more data is collected with time. In addition, as the number of available data sources grow, expectation maximization methods can be used to fill in feature gaps within the data (i.e some data is available for certain boards but not for others). Also, the results can be improved over time using feature selection methods.

Increasing the granularity of data extracted to pull out groups with particular interests can also contribute to board selection by isolating movement patterns and correlating with projected data. In one example, visitors to an interior design show planned for a particular venue may be of varying demographics, ages and sexes. However, the same population have a shared interest in paint colours and wall finishings. A creative for a hardware store may include various individual advertisements directed at different types of customers, and the advertisements directed at customers with an interest in home décor, rather than those with an interest in plumbing, can be selected by type of advertisement as well as board selection near the interior design show venue.

Real-Time Price Adjustment

Since many advertisers can choose similar settings for their campaigns, bottlenecks may be created. Some boards could be highly targeted due to fulfilling popular demographics, while other boards may be underused. The system can therefore be adapted to adjust prices based on demand. Digital boards generally have a base rate card, which the board vendor determines when adding the board to the system. Then, depending on demand, the system can determine a ratio by which the base rate will be multiplied, either increasing or decreasing cost for that board. Since advertising systems usually select advertisers through a bidding system, the highest bidders will get the most popular and effective boards, while other advertisers will get cheaper, less effective boards, but will pay less for them.

Such financial information can be presented to the advertiser at campaign creation for consideration. When entering their campaign criteria, advertisers can be presented with a plan of the boards they could get and how many impressions they can expect to get for their budget, based on estimated trends for the moment their campaign will take place. Alternatives are offered, allowing the advertiser to fine-tune their criteria to create a campaign that reaches their desired audience while respecting their budget. In one scenario, the advertiser may opt for a more limited campaign on the most expensive boards for a shorter period of time. Alternatively, a longer campaign on smaller or less prominent boards may be more favorable to the advertiser.

In another example, a board is located by an office building that is near a sports arena. During the day, ads targeting office workers are playing. Early in the evening, locational data as well as social networks such as Twitter feeds or Facebook posts indicate that a lot of young male football fans will be headed to the stadium to watch a football game. The Video Player receives new content from the ad server that specifically targets young male football fans, such as television networks offering sports network packages. If instead the event at the sports arena is a figure skating competition, locational data as well as social networks will indicate an influx of women in the 25-50 demographic to the area around the arena, and the Ad server will adjust the content on the board to specifically target the local demographic, maximizing the number of appropriate viewers of the ad.

The system can thereby proactively plug into data sources of those venues, see what shows are coming up and be ready for it. If there is a show for a famous rock band at Madison Square Garden on February 21st from 8 PM to 12 AM, the system can display ads appropriate for fans of the famous rock band between around 6:00 PM and 2:00 AM as people come in and out of the show. Social media data may also suggest that fans of the famous rock band may also be interested in various other bands, and advertisements for concerts and music from these other bands can be shown on the same boards to the fans of the famous rock band. Correlation of the interest preferences of these fans with fan interest in other bands can be obtained from a multitude of social media and/or music sharing or music playing websites which have algorithms for selecting like music. Additionally, through social media interest mapping, it may be found that, for example, fans of the famous rock band also report ranking fantasy movies as their favorite movie genre. In this way, boards in the vicinity of the concert of the famous rock band around the same time as the concert can be used to effectively advertise other rock bands with a similar sound to the famous rock band and/or new fantasy movies to a highly receptive audience.

All publications, patents and patent applications mentioned in this Specification are indicative of the level of skill of those skilled in the art to which this invention pertains and are herein incorporated by reference to the same extent as if each individual publication, patent, or patent application was specifically and individually indicated to be incorporated by reference.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for an out of home advertising campaign, the method comprising:
   supplying creative for the campaign;
   registering one or more digital boards with an ad server;
   determining creative criteria for the campaign, the creative criteria comprising targeting a demographic of users;
   categorizing, using static data, the one or more digital boards to obtain a categorization of the one or more digital boards for a first plurality of demographics;
   re-categorizing, using real-time data, the one or more digital boards to obtain a first re-categorization of the one or more digital boards for a second plurality of demographics;
   selecting, based on the first re-categorization of the one or more digital boards for the second plurality of demographics, a selection of the one or more digital boards for display of the creative; and
   displaying the creative on the selection of the one or more digital boards,
   wherein the one or more digital boards periodically reconnect with the ad server to update the creative to display.

2. The method of claim 1, wherein the real-time data is continuously updated.

3. The method of claim 1, further comprising:
   updating, based on the real-time data, the selection of the one or more digital boards to obtain an updated selection of the one or more digital boards; and
   displaying the creative on the updated selection of the one or more digital boards.

4. The method of claim 1, wherein the creative comprises at least one selected from a group consisting of images, video, web pages, dynamic elements, countdown timers, and stock tickers.

5. The method of claim 1, further comprising generating an ongoing report so that an advertiser can adjust the campaign, the creative, and/or a budget during the campaign.

6. The method of claim 1, wherein the re-categorizing comprises:
   determining a first demographic for a digital board of the one or more digital boards using a profile of a user who made a social networking post on a social media site while being close to the digital board.

7. The method of claim 1, further comprising:
determining, using projected data, a first demographic for a digital board of the one or more digital boards, wherein the projected data describes a planned event near a location of the digital board, and wherein the first demographic corresponds to the planned event near the location of the digital board; and
re-categorizing, using the first demographic, the one or more digital boards.

8. The method of claim 1, further comprising:
selecting a plurality of features associated with the one or more digital boards, wherein the plurality of features comprise (i) static features associated with the static data and (ii) real-time features associated with the real-time data; and
training a machine learning model to associate the plurality of features with a third plurality of demographics, wherein the re-categorizing is performed by the machine learning model.

9. An out of home digital ad server comprising:
one or more digital boards registered with the ad server;
a digital feed provider comprising a processor for providing each digital board with creative to be displayed;
a computer processor to:
categorize, using static data, the one or more digital boards to obtain a categorization of the one or more digital boards for a first plurality of demographics,
re-categorize the one or more digital boards using real-time data to obtain a re-categorization of the one or more digital boards for a second plurality of demographics,
select, based on the re-categorization of the one or more digital boards for the second plurality of demographics, a selection of the one or more digital boards for display of the creative, and
display the creative on the selection of the one or more digital boards; and
a communication network which directs the creative from the computer processor to the selection of the one or more digital boards,
wherein the one or more digital boards periodically reconnect with the ad server to update the creative to display.

10. The ad server of claim 9, further comprising a communication link to a data network to obtain the real-time data from the data network.

11. The ad server of claim 9, wherein the one or more digital boards each comprise a memory which records playback-related statistics on the creative played on the respective digital board.

12. The ad server of claim 9, wherein the one or more digital boards each comprise a memory which stores the creative, which is then downloaded and stored locally in a local database or file system.

13. The ad server of claim 9, wherein the computer processor further re-categorizes by:
determining a first demographic for a digital board of the one or more digital boards using a profile of a user who made a social networking post on a social media site while being close to the digital board.

14. The ad server of claim 9, wherein the computer processor further:
determines, using projected data, a first demographic for a digital board of the one or more digital boards, wherein the projected data describes a planned event near a location of the digital board, and wherein the first demographic corresponds to the planned event near the location of the digital board, and
re-categorizes, using the first demographic, the one or more digital boards.

15. The ad server of claim 9, wherein the computer processor further:
selects a plurality of features associated with the one or more digital boards, wherein the plurality of features comprise (i) static features associated with the static data and (ii) real-time features associated with the real-time data, and
trains a machine learning model to associate the plurality of features with a third plurality of demographics, wherein the re-categorizing is performed by the machine learning model.

* * * * *